J. H. BAUER.
FORCE FEED SEEDER.
APPLICATION FILED APR. 28, 1910.

968,526.

Patented Aug. 30, 1910.

2 SHEETS—SHEET 1.

Witnesses

Inventor
John H. Bauer.
By D. Swift & Co.
Attorneys

J. H. BAUER.
FORCE FEED SEEDER.
APPLICATION FILED APR. 28, 1910.
968,526.
Patented Aug. 30, 1910.
2 SHEETS—SHEET 2.
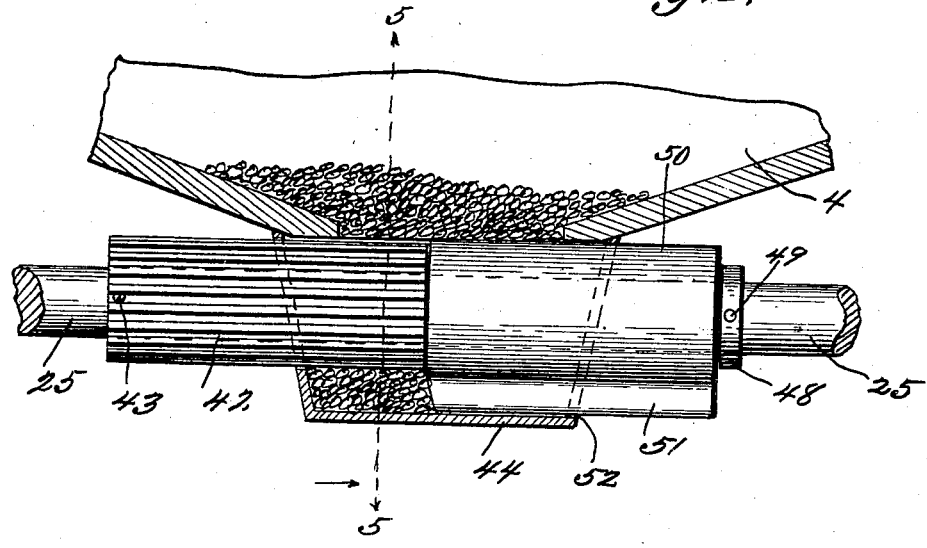
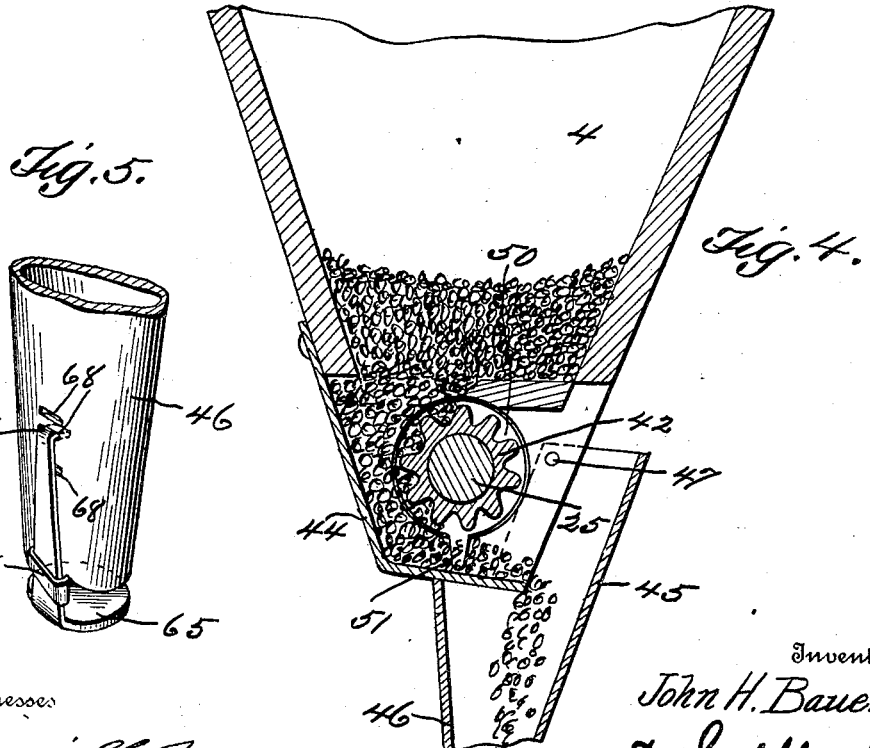
Witnesses
Francis G. Boswell
L. V. White
Inventor
John H. Bauer
By D. Swift & Co.
Attorneys

UNITED STATES PATENT OFFICE.

JOHN H. BAUER, OF ELM, NORTH DAKOTA.

FORCE-FEED SEEDER.

968,526.

Specification of Letters Patent. Patented Aug. 30, 1910.

Application filed April 28, 1910. Serial No. 558,267.

*To all whom it may concern:*

Be it known that I, JOHN H. BAUER, a citizen of the United States, residing at Elm, in the county of Morton and State of North Dakota, have invented a new and useful Force-Feed Seeder; and I do hereby declare the following to be a full, clear, and exact description of the invention, such as will enable others skilled in the art to which it appertains to make and use the same.

This invention pertains to a new and useful force feed seeder, adapted for use upon sulky or gang plows of any suitable structure; and the primary object of the invention is to provide a manually reciprocating shaft having means thereon for cutting off the flow of the seed and means also thereon for forcing the seed through the chute, when the flow is not cut off. This shaft is also rotatable, and the means for forcing the seed through the chute is also rotatable with it. But the means for cutting off the flow of the seed is not rotatable with the shaft, but slidable with it.

A further object of the invention is the provision of means for throwing this shaft into and out of gear.

A further feature of the invention is the production of means whereby this shaft may be shifted, laterally of the seed box, in order to cut off the flow of seeds, or to force the seed through the chute.

By this mechanism, and the novel application of the same to a plow, not shown, the seed may be dropped in front of the plow, after which the furrows are turned and the seed plowed there-under.

In this specification and the annexed drawings, a particular design of device is adhered to, but the invention is not to be confined to this specific design. The device in its actual reduction to practice may necessitate changes and variations, but the right thereto belongs to the applicant, provided such changes and variations are comprehended by the appended claims.

Further features and combination of parts will be hereinafter set forth and pointed out in the appended claims.

Figure 1:
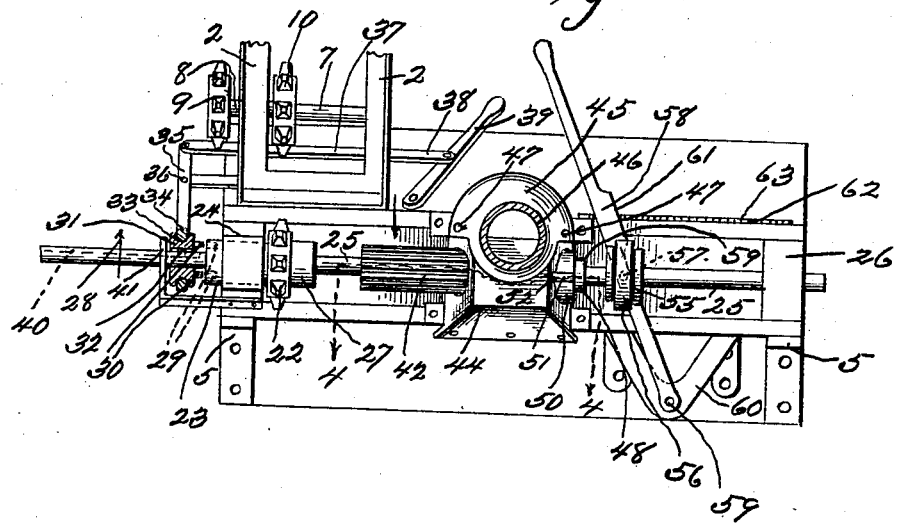
Figure 2:
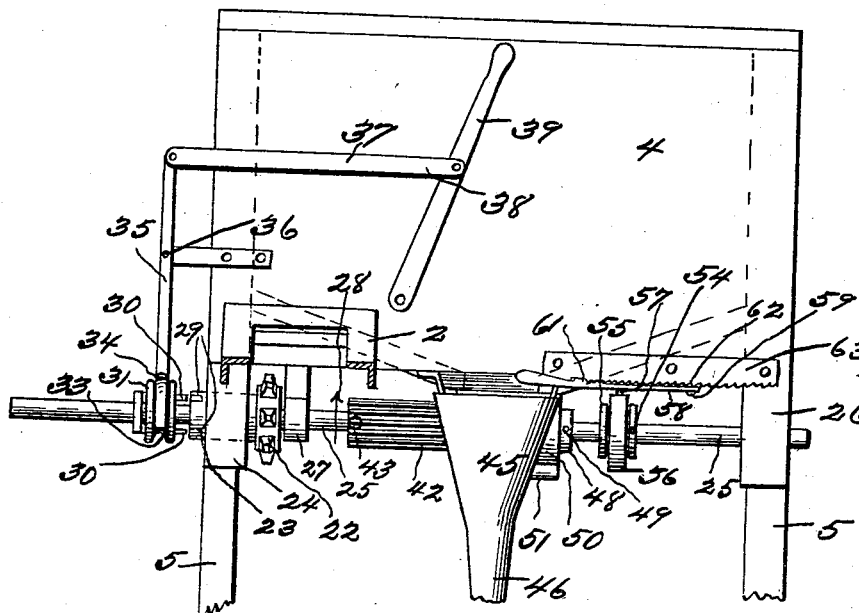

In the drawings:—Figure 1 is a bottom plan view of the seeder attachment, showing the grain chute in section, and the means for shifting the shaft and throwing the same into and out of gear. Fig. 2 is a front elevation of the seeder attachment. Fig. 3 is a sectional view on line 4—4 of Fig. 1. Fig. 4 is a sectional view on line 5—5 of Fig. 3. Fig. 5 is a detail perspective view of the lower portion of the grain chute.

As to the annexed drawing, 2 denotes rectangular arranged beams, which may be extended to any desired length, and may be secured, in any suitable manner, to the frame of a sulky or gang-plow, and to the upper ends thereof the seed box 4 is supported. The seed box is also supported by the members 5, which may connect between the box and the frame of a plow.

Any suitable sprocket chain or other means may be geared with the sprocket wheel 22. This sprocket wheel 22 is provided with a hub portion 23 (which penetrates or passes through the projection or end 24 of the seed box or receptacle 4). The sprocket wheel 22 is loosely mounted upon the shaft 25 (which slides and rotates within the sprocket wheel 22 and the hub portion thereof, and is mounted also in the other projection or end 26 of the seed box). The shaft 25 is also journaled in the bearing 27, between which and the projection or end 24 of the seed box the sprocket wheel 22 is located. When power is geared to the sprocket wheel 22, a rotary movement is then imparted to the shaft 25, in the direction of the arrow 28. The hub portion 23 at one end is provided with depressions, to receive the projections or lugs 30 of the clutch collar 31, which is splined by the key or lug 32 to the shaft 25, in order that the shaft 25 may slide through the clutch collar. The clutch collar, however, as will be observed, is designed to rotate with the shaft 25. The key or lug 32 is integral with, and projects from the inner circumference of the bore of the collar.

The clutch collar is provided with an annular groove 33, which receives the forked end 34 of the lever 35, which is fulcrumed at 36. Pivoted to the lever 35 is a connecting bar 37, the end 38 of which is pivoted to the hand operated lever 39. By oscillating the lever 39, the clutch collar may be laterally shifted, in one direction or the other, in order that the projections or lugs 30 may engage or disengage the depressions 29, so that the shaft 25 and the sprocket wheel 22 may be thrown into and out of gear. The key or lug 32 moves in a key-way or groove 40 of the shaft 25. To hold the clutch collar approximately in one location upon the shaft 25, or adjacent the hub portion of the sprocket wheel 22, an angular arm 41 is provided, which is secured to the projection 24 of the seed box or receptacle, and through the angled ends of this arm the shaft 25 slides and rotates.

Fixed to rotate and slide laterally with the shaft 25, is a corrugated cylinder 42. This cylinder 42 is fixed to the shaft 25, as at 43. This cylinder moves laterally through the casing 44 (to which the enlarged end 45 of the grain chute 46 is fixed, as at 47). Fixed to the shaft 25, as at 49, is a collar 48, between which and the corrugated cylinder 42, the sleeved cylinder 50 is disposed. This sleeved cylinder 50 is provided with a downwardly projecting elongated finger or flange 51, which is movable within a recess 52 of the casing 44. This finger or flange 51 performs two functions, namely, it prevents the cylinder 50 from rotating with the shaft 25, and also serves as a medium whereby the flow of seed or grain is cut off. By shifting the shaft 25, it will be observed that the cylinder 50 will move laterally with it, because the same is located between the corrugated cylinder 42 and the collar 48. It will be further observed that as the cylinder 50 is moved laterally with the shaft 25, the elongated finger or flange 51 will close the passageway of the seed or grain in the casing 44.

Fixed at 54, to the shaft 25, in order to rotate and shift with it, is an annular grooved member 55. Surrounding the groove of this member 55 is a collar 56, from which projects a pin 57, which is pivotally connected to the lever 58. The lever 58 is fulcrumed at 59 to the bracket 60 of the grain box or receptacle. This lever 58 is provided with an extension 61, which is designed to engage the teeth 62 of the rack bar 63, in order to hold the lever 58 in various adjusted positions. By the manipulation of the lever 58, the shaft 25 may be shifted laterally in one direction or the other, as the case may be, in order to cut off or graduate the flow of grain, to allow the same to pass through the grain chute. When the passageway for the grain or seed is closed, the sprocket wheel 22 and the shaft 25 may be thrown out of gear by the operation of a lever 39. The lower end of the grain chute 46 is provided with an adjustable closure and scatterer 65, which is slidable through the strap or plate 66, the upper angled end 67 being adjustable within any one of the openings 68 of the grain chute. The grain as it leaves the seed box or receptacle, passes through the casing 44 when the passageway thereof is not closed by the elongated finger or flange 51, and thence through the grain chute 46, until it leaves the lower end thereof, and by disposing the grain chute in front of the plows, as shown in Fig. 1, the grain will be deposited in front of the plows, and after which the furrows are turned and the seed plowed thereunder. There is only one grain chute shown and described, but it is evident, and it is to be understood that several or more may be provided.

The invention having been set forth, what is claimed as new and useful is:—

1. In a force feed seeder, a grain box having a casing and provided with downwardly projecting portions or bearings, a shifting and rotatable shaft mounted in said bearings and extending transversely of the casing, said shaft having a corrugated feed member and a cut-off follower, said shaft having thereon a loosely mounted sprocket, to which power may be geared, and having a sleeve clutch member journaled in one of said bearings, said sprocket being rotatable with or independent of the shaft and having a limited movement between two of the bearings, a clutch member mounted slidably on and rotatable with the shaft adjacent the clutch end of the sleeve, and designed to have a limited movement, a bracket bearing to limit the movement of the clutch member, and means for operating the clutch member.

2. In a force feed seeder, the combination of the seed box having downwardly projecting bearings and a shifting and rotatable shaft in said bearings, of a casing, said shaft having a feed member and a cut-off follower, said shaft having thereon a loosely mounted sprocket, to which power may be geared and having a sleeve clutch member journaled in one of said bearings, said sprocket being rotatable with or independent of the shaft and having a limited movement between two of the bearings, a clutch member mounted slidably on and rotatable with the shaft adjacent the clutch end of the sleeve and designed to have a limited movement, a bracket bearing to limit the movement of the clutch member, means for operating the clutch member, and means for shifting and setting the shaft.

In testimony whereof I have signed my name to this specification in the presence of two subscribing witnesses.

JOHN H. BAUER.

Witnesses:
GOTTFRIED VOSSLER,
JAKOB GOMAS.